United States Patent [19]
Vikiö

[11] Patent Number: 4,671,878
[45] Date of Patent: Jun. 9, 1987

[54] MEANS FOR CLEARING THE BLOCKED REJECT END OF A VORTEX PURIFIER

[75] Inventor: Pentti Vikiö, Middleboro, Mass.

[73] Assignee: Enso-Gutzeit Oy, Helsinki, Finland

[21] Appl. No.: 794,750

[22] Filed: Nov. 4, 1985

[30] Foreign Application Priority Data

Nov. 9, 1984 [FI] Finland .................................. 844408

[51] Int. Cl.4 .............................................. B01D 53/24
[52] U.S. Cl. .................................. 210/512.3; 210/541
[58] Field of Search ............... 210/512.1, 512.2, 512.3, 210/304, 787, 788, 789, 541, 542; 209/144, 211

[56] References Cited

FOREIGN PATENT DOCUMENTS 65458 4/1984 Finland .

*Primary Examiner*—Frank Sever
*Attorney, Agent, or Firm*—Toren, McGeady and Goldberg

[57] ABSTRACT

Apparatus for clearing the blocked reject end of a vortex purifier without interrupting the operation of the vortex purifier, the apparatus includes an opening device for detaching the bottom plug of the reject end of the vortex purifier and an exit aperture for conducting off the reject of the vortex purifier. For enhancing the operation of the device of this type known in prior art, a valve is provided connected to the reject end of the vortex purifier for the duration of opening the plug, and that the device extending through the valve can be removed and replaced with a cleaning member, with the aid of which the blockage remaining in the reject end in spite of the removal of the bottom plug can be cleared.

4 Claims, 4 Drawing Figures

MEANS FOR CLEARING THE BLOCKED REJECT END OF A VORTEX PURIFIER

BACKGROUND OF THE INVENTION

The present invention concerns a means for clearing the blocked reject end of a vortex purifier without interrupting normal operation of the vortex purifier.

Vortex purifiers (also hydro or liquid cyclones) are used mainly in the cellulose and paper industry for purifying fibre suspensions of impurities, such as sand, bark and splinter particles and metal particles. The fibre suspension to be purified is supplied under pressure tangentially into the vortex purifier, whereby the mass is set into rapid rotation, the materials in the fibre suspension having different specific gravities in shape being separated onto circles with different radii by effect of the centrifugal force created by said rotation. Heavier constituents, such as sand, become separated on the outer circumference and move towards the exit aperture with comparatively small diameter in the tip of the sorter cone. The purified fibre suspension, the accept flow, exits around the vacuum core that is established in the vortex purifier, into a coaxial exit tube at the accept end of the vortex purifier.

Since vortex purifiers become more efficient in removing small foreign particles when the diameter of the vortex purifier is reduced, the industry has adopted the practice of using a greater number of vortex purifiers with smaller dimensions. The problem, particularly in present small vortex purifiers, is blocking of the reject exit aperture. Such blocking is caused by over-sized particles and by slowly accumulating deposits in the vicinity of the exit aperture. When the reject aperture becomes blocked, the sorting ability of the vortex purifier ceases and the impurities are entrained with the accept flow to subsequent process steps.

Solutions of this problem known in the art are of many kinds as to their characteristic features. The oldest vortex purifiers had to be partly dismantled when clearing the blocked reject exit aperture. Other designs have included reject exit apertures of variable size, water or compressed air jets directed into the exit aperture, valves placed at the exit apertures of the apparatus, and combinations of these.

Said designs are characterized by the use of force or pressure for disrupting the blockage, whereat impurities tend to be entrained with the accept flow and to discharge through the accept tube of the vortex purifier, thereby contaminating the accept mass. The valve designs are fixed in nature and become expensive because the reject end of each vortex purifier must be provided with a valve.

In the Finnish Pat. No. 65458 is disclosed a well-functioning design for clearing the reject end of a vortex purifier. Therein, to the reject end is connected a separate cleaning means with which the bottom plug of the purifier is opened. The reject flow is conducted through an exit aperture in said means to the desired location without interfering with the operation of the purifier and without contaminating the accept flow.

OBJECT OF THE INVENTION

The object of the present invention is to develop further this cleaning means so that the clearing even the most serious blockages is easily and rapidly accomplished. For attaining this aim, the opening means of the invention is mainly characterized in that the body of the means consists of a valve which is attachable to the reject end of the cone of the vortex purifier for the duration of opening the plug in a manner known in itself in the art, and that said opening means extending through the valve can be removed and replaced with a cleaning member by the aid of which the blockage remaining in the exit end in spite of removing the bottom plug can be cleared.

An advantageous embodiment of the means of the invention is characterized in that the valve serving as body of the means is a three way spherical valve with T-bore, in which its branched part constitutes the exit aperture for the reject blockage.

Another advantageous embodiment of the means of the invention is characterized in that the valve serving as body of the means is an ordinary valve provided with a connector, the connector disposed on the side towards the cone of the vortex purifier constituting the exit aperture for the reject blockage.

An advantageous embodiment of the means of the invention is also characterized in that the cleaning member consists of a rigid tube which can be inserted in the cone of the vortex purifier and through which compressed air or fluid under pressure can be conducted for enhancing the detachment of the blockage.

BRIEF DESCRIPTION OF ATTACHED DRAWINGS

The invention is described with the aid of an example, referring to the drawings attached, wherein:

FIG. 1 is a perspective view of the opening means of the invention and of the other appliances associated therewith.

FIG. 2 presents the opening means ready for operation, attached to the reject end of the vortex purifier, FIG. 3 illustrates the situation after the bottom plug has been detached and when the blockage can flow out of the cone, FIG. 4 illustrates the situation in which the bottom plug detaching means has been removed and replaced with the cleaning member.

DETAILED DESCRIPTION OF THE PREFERRED EMBODIMENT

Figure 1:
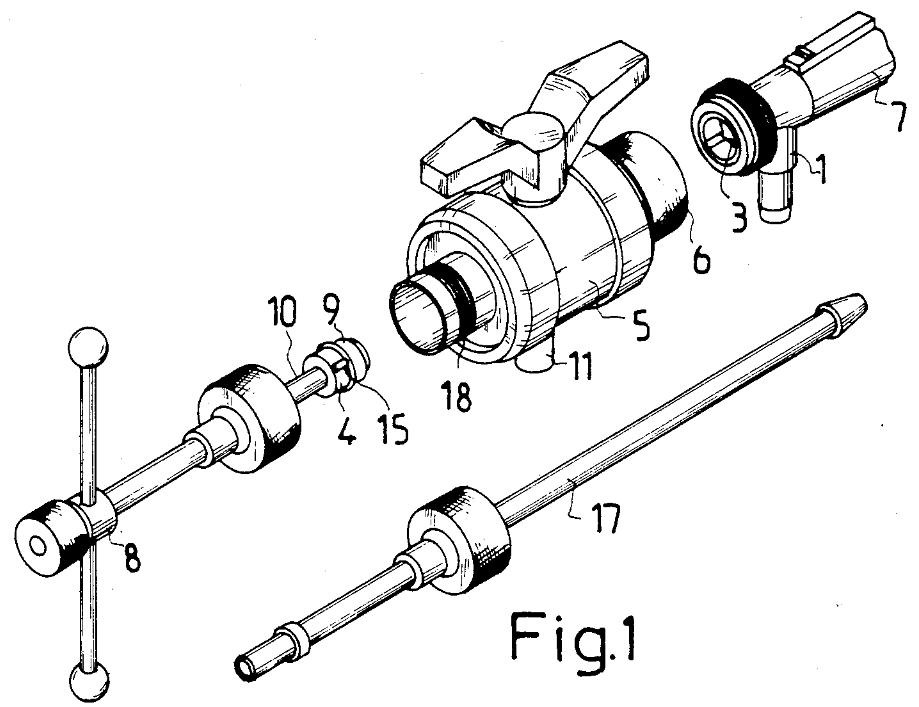

In FIG. 1, topmost is seen the reject end of a vortex purifier 7, showing the reject exit aperture 1 and the plug 3 in the clearing aperture 2. In the embodiment of FIG. 1, the clearing means consists of a spherical valve body 45 with T-bore having fixing elements 6 for attaching the valve on the end of the reject end cone of the purifier 7, fixing elements 18 for attaching the opening means 8 of the bottom plug 3 or the blockage cleaning tube 17 to the valve body 5, and an exit aperture 11 for the blockage.

The opening head 4 of the opening means 8 constitutes an entity of its own, having locking members 15 fo the shaft end 9 and the tubular shaft 10, for attachment to the plug 3, e.g. in the manner as disclosed in the Finnish Pat. No. 65458.

Figure 2:
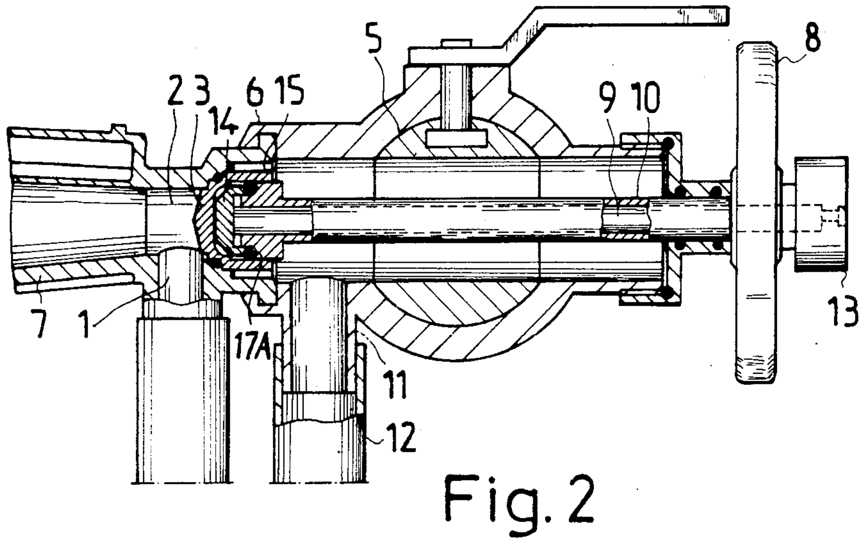

In FIG. 2, the clearing means has been screwed fast to the vortex purifier with threads or another quick-locking means 6. The ribs 15 on the clearing head 4 interlock the tubular shaft 10 with the plug 3 of the vortex purifier in such manner that the plug 3 can be rotated in both directions. The friction joint ring 17A on the shaft 9, to which pressure can be applied by means of the tightening screw 13 and over the flange 14, urges the opening head 4 into firm contact with the plug 3 so that the plug will not become detached from the opening head when the plug 3 is being pulled out.

In FIG. 2 has furthermore by way of an example been presented an embodiment differing slightly from FIG. 1, in which the valve 5 is an ordinary spherical valve having at one end a connector serving as exit aperture 11 for the blockage.

Figure 3:
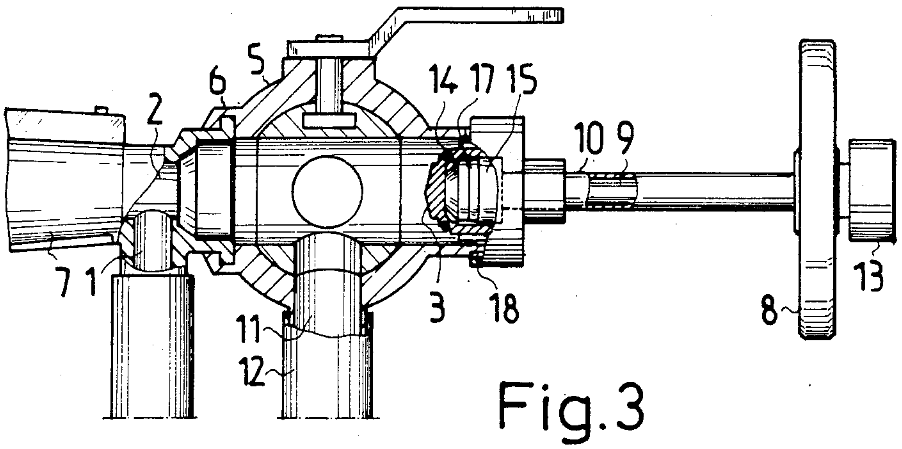

In FIG. 3, the plug 3 of the vortex purifier as been withdrawn and the blockage in the clearing aperture 2 of the reject end can flow down towards the exit aperture 11. The spherical valve 5 may now be closed and opened, which usually causes the blockage to become detached and to flow through the valve and out through the exit aperture 11.

Figure 4:
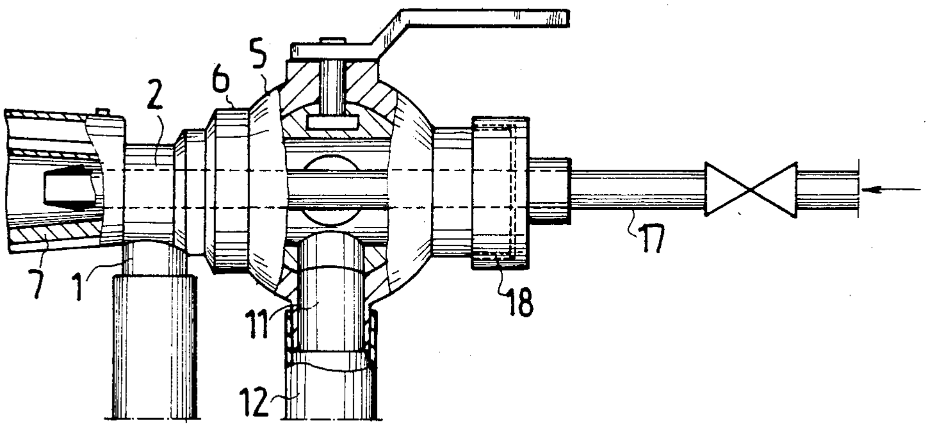

In case the cone 7 is not relieved of the blockage even though the plug 3 has been removed, the valve 5 can be closed to through-flow, the opening means 8 with the bottom plug removed by unscrewing the thread junction 18 and by substituting for the clearing means a cleaning member fitting into the same threads of the valve body 5, this cleaning member comprising a cleaning tube 17 that can be pushed into the cone 7. This situation is illustrated in FIG. 4. By closing the valve, the advantage is gained that no reject mass will splash upon the person operating the clearing means even if the blockage should come free while the clearing means is being taken off. The thread juncture 18 is preferably sealed, and compressed air or water under pressure can be directed on the blockage through the cleaning tube 17 for detaching the blockage and flushing it out of the cone 7.

The normal operation of the vortex purifiers and the entire installation is not disturbed by the clearing process. The result can be examined after reinserting the plug and the clearing measures repeated if need be, e.g. by performing several reciprocating clearing movements with the plug 3 or the cleaning tube 17.

It is obvious to a person skilled in the art that the invention is not exclusively restricted to the above example, but its various embodiments may vary within the scope of the claims presented below. For instance, the constructions of the extraction members and of the cleaning member may vary, and the exit aperture 11 may also consist of a separate T-connector connected between the valve body and the cone of the vortex purifier.

I claim:

1. In a vortex purifier for removing impurities from a suspension and comprising an axially extending conically shaped bore with a smaller diameter end forming a clearing aperture coaxial with said bore, a plug insertable into said clearing aperture for forming a sealed closure therefor, a reject exit aperture adjacent the smaller diameter end and extending transversely of the axis of said bore for removing the impurities during operation of the vortex purifier, means for clearing blockage from the smaller diameter end of the said passageway, the improvement comprising that said means comprises a valve attachable to the smaller diameter end of said vortex purifier, said valve having a passageway therethrough axially alignable with said bore in said vortex purifier, means insertable through the passageway in said valve into engagement with said plug for removing said plug from said clearing aperture, an exit aperture from said valve passageway for removing blockage therethrough removed through the clearing aperture when said plug is removed, said means for removing said plug being removable from said valve and said valve being arranged to close said passageway therethrough, and means removably connectable to said valve and arranged to be inserted through said valve passageway into said bore in said vortex purifier when said passageway through said valve is opened so that any blockage remaining after said plug has been removed can be removed.

2. In a vortex purifier, as set forth in claim 1, wherein said valve is a three-way spherical valve including a T-bore with a portion of said T-bore forming the passageway through said valve and a branch part from said passageway forming said exit aperture for the reject blockage.

3. In a vortex purifier, as set forth in claim 1, wherein said valve comprises a valve body having a connector portion located on the side of said valve body secured to the smaller diameter end of said vortex purifier and said connector portion forms a continuation of said passageway through said valve and includes said exit aperture for the removal of reject blockage.

4. In a vortex purifier, as set forth in claim 1, wherein said means for removing remaining blockage from said vortex purifier comprises an axially elongated rigid tube insertable through said valve into the smaller diameter end of said vortex purifier, said rigid tube being arranged for conducting a pressurized fluid into said bore in said vortex purifier for detaching remaining blockage.

* * * * *